US012783715B2

(12) United States Patent
Archer et al.

(10) Patent No.: US 12,783,715 B2
(45) Date of Patent: Nov. 3, 2026

(54) DATA PRIVACY PRESERVING AGE GATING SERVICE

(71) Applicant: Snap Inc., Santa Monica, CA (US)

(72) Inventors: Virgil L. Archer, Los Angeles, CA (US); Rushi Jash, Long Beach, CA (US); Bernardo Perez, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 809 days.

(21) Appl. No.: 17/881,035

(22) Filed: Aug. 4, 2022

(65) Prior Publication Data

US 2024/0045987 A1 Feb. 8, 2024

(51) Int. Cl.
*G06F 21/62* (2013.01)

(52) U.S. Cl.
CPC .. *G06F 21/6245* (2013.01); *G06F 2221/2115* (2013.01); *G06F 2221/2141* (2013.01)

(58) Field of Classification Search
None
See application file for complete search history.

(56) References Cited

U.S. PATENT DOCUMENTS 12,039,581 B2 * 7/2024 Patel ........................ A24F 40/53
2011/0185400 A1 * 7/2011 Webber ............... G06F 21/6227 726/4
2017/0236230 A1 * 8/2017 Thomas ................ H04L 67/535 705/325
2020/0167843 A1 * 5/2020 Nguyen ............. G06Q 30/0607
2020/0201967 A1 * 6/2020 Maxwell .............. G06V 40/197
2021/0065267 A1 * 3/2021 Smith ................ G06Q 20/4014
2022/0005047 A1 * 1/2022 Maheshwari ...... G06Q 20/3223
2022/0141213 A1 * 5/2022 N ........................ H04L 63/0815 726/6
2023/0232217 A1 * 7/2023 Rosencrantz ......... H04W 12/72 726/6

* cited by examiner

*Primary Examiner* — Bassam A Noaman
(74) *Attorney, Agent, or Firm* — SCHWEGMAN LUNDBERG & WOESSNER, P.A.

(57) ABSTRACT

Described herein is an online service having an integral age gating service. The age gating service is accessible to third-party applications via an application programming interface (API). Consistent with some embodiments, the API includes a method or function call that allows a third-party application developer to establish for a third-party application, age gating logic, for use by the third-party application. The age gating logic may specify a global age threshold, or more than one regional age threshold. The age gating service relies on an access token of an open standards authentication protocol, to provide the third-party application with a Boolean value indicating whether an end-user is above or below an age threshold, without revealing to the third-party application the stated age of an end-user.

20 Claims, 7 Drawing Sheets

FIG. 5
400
3:54 pm
M
MOVIE Watch Party
Watch free episodes with your friends
If you use the Movie app, we will give it access to some information about you, including your Display Name, and signal whether you are over/ under an age threshold to determine access to any age restricted content. When you are using the Movie app, it may also capture your device information, and any information you share. Learn more here.
502
CONTINUE
FIRST-TIME END-USER EXPERIENCE MESSAGE
500

DATA PRIVACY PRESERVING AGE GATING SERVICE

TECHNICAL FIELD

The present disclosure relates to a feature of an online service or system that makes it possible for third-party applications to obtain a binary signal (e.g., a Boolean value) indicating whether a registered end-user of the online service is of an age that is above or below an age threshold, while preserving the data privacy of registered end-users of the online service.

BACKGROUND

Many Internet-enabled or online services require that each individual establish an end-user account when the individual initially registers to use the online service. Moreover, once the individual has established an end-user account, the end-user may be prompted to provide a wide variety of personal information, such as the individual's full name, age or date of birth, residential or mailing address, and so forth. While this basic information may be used to properly identify each end-user, and specifically, to distinguish one end-user from another, in many instances, online services may prompt each end-user to provide other personal information relating to a variety of physical and behavioral characteristics, interests, preferences, and so forth. Moreover, many online services attempt to integrate social features and functionality into their primary service offerings by prompting each end-user to identify other end-users with whom the individual may be acquainted, for example, as friends, co-workers, or by virtue of some other relationship. In this way, the online service can provide shared social experiences.

In many instances, the information that an online service collects about each end-user—frequently referred to as an end-user profile, or simply, a user profile—is used to tailor or personalize the online service for the alleged benefit of the end-user. For example, a dating site or service may prompt end-users to provide information about their physical characteristics (e.g., height, weight, eye and/or hair color, and so forth) for the stated purpose of matching the individual with other end-users. However, it is well known that many online services use the personal information collected about each end-user in nefarious ways. In particular, some online services have been known to sell end-user information to third parties, who may then conduct research relating to individuals and/or groups, for any number of purposes, to include targeting individuals with advertising and/or marketing activities, political campaign messaging, and so forth. In other instances, an online service may provide software tools and resources that enable third-party developers to develop applications that partially integrate with the online service, for example, by allowing the third-party applications to access some or all of an end-user's profile data, so that the third-party application can tailor the behavior of the application to the end-user. Unfortunately, third-party developers who are allowed access to end-user data may also use the end-users' personal data in nefarious ways.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Figure 1:
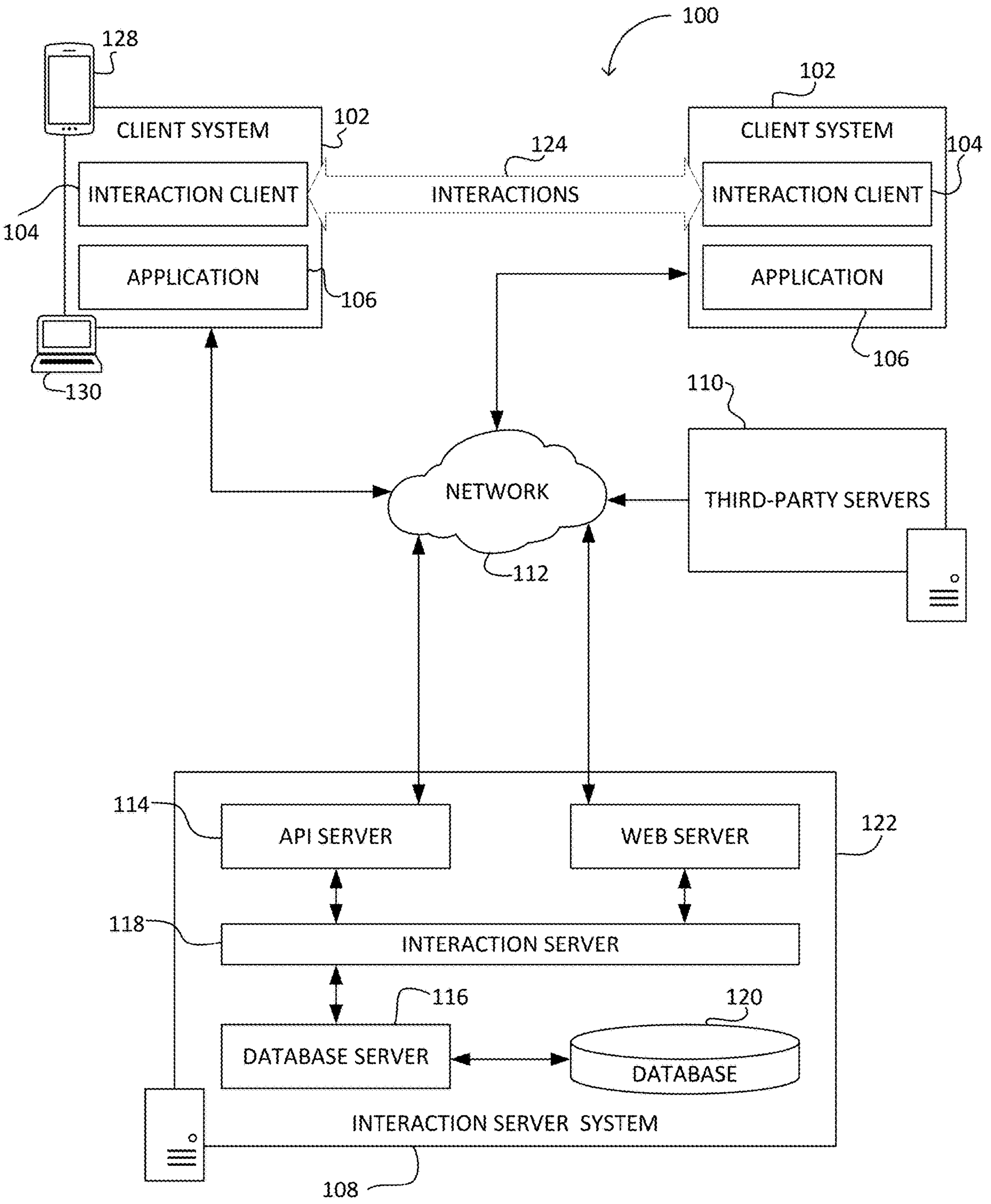
FIG. 1 is a diagrammatic representation of a networked, client/server-based environment in which a software-based age gating service, consistent with embodiments of the present invention, may be deployed.

Described herein is a software-based, age gating service that is integrated with an online service and is accessible to third-party applications via an application programming interface (API) of a software development kit (SDK) associated with the online service. Specifically, the present disclosure describes techniques for providing to third-party applications an API function or method that will return a Boolean value indicating whether an end-user of an online service is above or below an age threshold, so that the third-party application can provide the end-user with an age-gated experience by tailoring the behavior of the application to depend upon the age of the end-user, without the online service revealing the stated age of the end-user. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Consistent with some embodiments, an online service—referred to herein as an interaction service, implemented with an interaction server system—includes an SDK that provides third-party application developers with software-based tools for integrating various aspects and features of the online service into third-party applications. In some instances, the third-party applications execute from within the client application—referred to herein as the interaction client—of the interaction server system. Accordingly, the third-party applications may leverage various resources and data maintained by the interaction server system. The SDK specifies various API functions or methods that a third-party application can invoke to access certain computing and data resources of the online service, and specifically, to obtain certain information related to an end-user of the online service.

Consistent with some embodiments, the SDK specifies various API functions or methods for accessing what is referred to herein as an age gating service. The age gating service is a software-based service provided by the interaction server system that allows third-party applications to validate information about the age of an end-user, without the online service revealing to the third-party application the actual or stated age or birthdate of the end-user. As described in greater detail below, the SDK provides an API function or method that enables a third-party developer to establish age gating logic for use by the age gating service, and for the benefit of a specific third-party application. In some instances, the age gating logic may be as simple as a global age threshold. In this context, a global age threshold is an age threshold that applies to all end-users, regardless of their geographical location or region, such as their state or country of residence, and so forth. For example, if a third-party application uses a global age threshold with an age of eighteen, the age gating service will respond to a request for validating the age of an end-user with a Boolean value indicating whether the end-user's stated age is greater than or less than eighteen. In other instances, the age gating logic may include more than one regional age threshold, where each regional age threshold is for a particular geographic region. For example, in many instances, the laws of a particular jurisdiction may dictate certain age-based requirements. Accordingly, a third-party application developer may require that an application behave differently depending upon the geographic location or region of the end-user. As such, in some instances, the age gating logic may specify an age threshold for each of several geographic regions. When a third-party application makes a request to validate the age of an end-user, the age gating service may obtain information identifying the location of the end-user, and then apply a regional age threshold that is specific to that geographic location or region, for the specific end-user and third-party application.

Advantageously, the age gating service provides flexibility by allowing each third-party application developer to establish age gating logic for use on a per application basis. For instance, not only is each third-party application developer allowed to establish their own age gating logic, but each developer is also allowed to establish separate age gating logic for each application, when a developer has more than one application. Moreover, by allowing for different age gating thresholds on a per location basis, a single version of an application can be used in various geographic locations or regions, with different age gating thresholds. This eliminates the need for maintaining application programming code for multiple versions of the same application—one for each geographic location or region that has a different age requirement.

Consistent with some embodiments, subsequent to a third-party developer invoking an API function or method to establish age gating logic for a specific third-party application, an administrator of the online service (e.g., the interaction server system) may be required to review and approve the age gating logic, before the third-party application can be published and made available to end-users of the online service. Accordingly, consistent with some embodiments, when a third-party developer invokes a request to establish age gating logic for a third-party application, an administrator may receive a notification via a user interface of an admin portal, indicating that the age gating logic has been submitted and is awaiting review and approval by the administrator.

In addition to an API function or method for establishing age gating logic, the SDK of the online service also provides an API call for use by third-party applications that enables the third-party application to make a request to validate the age of an end-user, using the previously established age gating logic that has specifically been defined for the third-party application. By way of example, consider a scenario in which a third-party developer has created a third-party application that allows an end-user of the online service to access and view content from a content streaming service operated by the third-party developer. In order to confirm that an end-user of the online service is of an appropriate age to view age-restricted content provided by the third-party content streaming service, the third-party application will make an API call to the age gating service, on behalf of the end-user. The age gating service will return to the third-party application a Boolean value indicating whether the stated age of the end-user, as stored in an end-user profile of the end-user by the online service, is above or below an age specified as an age threshold in the age gating logic for the third-party application. If the age gating logic established by the third-party developer includes different age gating thresholds for different geographical regions, then the age gating service will determine the location of the end-user, for example, as specified in the end-user's profile, in order to apply the age gating threshold that is relevant to the particular location of the end-user. Alternatively, in some instances, the location of an end-user may be determined via a location service of the computing device of the end-user.

The age gating service described herein provides several technical advantages in comparison with conventional techniques for integrating third-party applications with an online service. For example, whereas many conventional techniques allow third-party applications to access the actual stated age of an end-user of an online service, the techniques consistent with the inventive subject matter described herein provide greater data privacy, by only providing to a third-party application a Boolean value that indicates whether the age of an end-user is above or below an age gating threshold. Furthermore, consistent with embodiments, the age gating service is implemented in a manner that provides significant flexibility, for example, by allowing each third-party application developer to establish its own age gating logic on a per application basis, and separate age gating thresholds for different geographic locations. Because the age gating logic is separated from the application logic of the third-party application, the same version of the application can be used in different geographic locations or regions, with age gating thresholds customized per location or region. By facilitating the establishment of the age gating logic through an API, developers for the online service are not required to spend significant amounts of time and effort in hard coding the logic for each third-party application developer. Moreover, as described in greater detail below, each third-party developer can maintain the age gating logic for their own application—by invoking requests via the API to modify or change the age gating logic for an application, as necessary. Many other advantages of the present inventive subject matter will be readily apparent to those skilled in the art from the description of the several figures that follows.

Networked Computing Environment

FIG. 1 is a block diagram showing an example interaction system 100 for facilitating interactions (e.g., exchanging text messages, conducting text, audio and video calls, playing games, and/or viewing content) over a network 112. The interaction system 100 includes multiple client systems 102, each of which hosts multiple applications, including an interaction client 104 and other applications 106. Each interaction client 104 is communicatively coupled, via one or more communication networks including a network 112 (e.g., the Internet), to other instances of the interaction client 104 (e.g., hosted on respective other client system 102), an interaction server system 108 and third-party servers 110). An interaction client 104 can also communicate with locally hosted applications 106 using Applications Programming Interfaces (APIs).

An interaction client 104 interacts with other interaction clients 104 and with the interaction server system 108 via the network 112. The data exchanged between the interaction clients 104 (e.g., interactions 124) and between the interaction clients 104 and the interaction server system 108 includes functions (e.g., commands to invoke functions) and payload data (e.g., text, audio, video, or other multimedia data). These functions and their respective payloads may be communicated via various communication protocols.

The interaction server system 108 provides server-side functionality via the network 112 to the interaction clients 104. While certain functions of the interaction system 100 are described herein as being performed by either an interaction client 104 or by the interaction server system 108, the location of certain functionality either within the interaction client 104 or the interaction server system 108 may be a design choice. For example, it may be technically preferable to initially deploy particular technology and functionality within the interaction server system 108 but to later migrate this technology and functionality to the interaction client 104 where a client system 102 has sufficient processing capacity.

The interaction server system 108 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 108, an API server 114 is coupled to and provides programmatic interfaces to interaction servers 118, making the functions of the interaction servers 118 accessible to interaction clients 104, other applications 106 and third-party servers 110. The interaction servers 118 are communicatively coupled to a database server 116, facilitating access to a database 120 that stores data associated with interactions processed by the interaction servers 118. Similarly, a web server 122 is coupled to the interaction servers 118 and provides web-based interfaces to the interaction servers 118. To this end, the web server 122 processes incoming network requests over the Hypertext Transfer Protocol (HTTP) and several other related protocols.

The API server 114 receives and transmits interaction data (e.g., commands and message payloads) between the interaction servers 118 and the client systems 102 (and for example, interaction clients 104 and other application 106) and the third-party servers 110. Specifically, the Application Programming Interface (API) server 114 provides a set of interfaces (e.g., routines and protocols) that can be called or queried by the interaction client 104 and other applications 106, including third-party applications, to invoke functionality of the interaction servers 118. The API server 114 exposes various functions supported by the interaction servers 118, including account registration, login functionality, the sending of interaction data via the interaction servers 118, from a particular interaction client 104 to another interaction client 104, the communication of media files (e.g., images or video) from an interaction client 104 to the interaction servers 118, the settings of a collection of media data (e.g., a story), the retrieval of a list of friends of a user of a client system 102, the retrieval of messages and content, the addition and deletion of entities (e.g., friends) to an entity graph (e.g., a social graph), the location of friends within a social graph, and opening an application event (e.g., relating to the interaction client 104).

An application 106 invoked via the interaction client 104 of a client system 102 may, in some instances, be a third-party application. As a third-party application, the application may not have authorization to access various resources of the interaction server system 108, and will therefore need to request authorization to access various resources on the interaction server system 108, on behalf of the end-user of the client system 102. Consistent with some embodiments, an open standards authorization protocol (e.g., Open Authorization, frequently referred to as Oauth, and more precisely, Oauth v2) may be used for access delegation, so that the end-user need not provide the third-party application with his or her end-user credentials (e.g., username/password). Accordingly, when an end-user of the client system 102 invokes a third-party application, the end-user may be prompted to grant the third-party application authorization to a resource owned by the end-user (e.g., the end-user's profile data). Upon receiving an authorization grant from the end-user, the third-party application may communicate the authorization grant to an authorization server, and in return, receive an access token. Subsequent API calls made by the third-party application (e.g., during the same end-user session) and directed to various resource servers of the interaction client system 108 will include the access token. Accordingly, a resource server that is processing an API call can confirm that the end-user and third-party application from which the access token was received is in fact authorized to access the resource.

The interaction servers 118 host multiple systems and subsystems, described below with reference to FIG. 2.

Third-Party Applications

Returning to the interaction client 104, features and functions of an external resource (e.g., a linked application 106 or applet) are made available to an end-user via a user interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the client system 102 (e.g., a "native app"), or a small-scale version of the application (e.g., an "applet") that is hosted on the client system 102 or remote of the client system 102 (e.g., on third-party servers 110). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the client system 102 can be launched independently of and separately from the interaction client 104, such as by selecting an icon, corresponding to the application 106 on a home screen of the client system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving from a third-party servers 110, for example, a markup-language document associated with the small-scale application and processing such a document.

In response to determining that the external resource is a locally-installed application 106, the interaction client 104 instructs the client system 102 to launch the external resource by executing locally-stored code corresponding to the external resource. In response to determining that the external resource is a web-based resource, the interaction client 104 communicates with the third-party servers 110 (for example) to obtain a markup-language document corresponding to the selected external resource. The interaction client 104 then processes the obtained markup-language document to present the web-based external resource within a user interface of the interaction client 104.

The interaction client 104 can notify a user of the client system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

In many instances, these external or third-party applications are, by default, not authorized to access resources of the interaction server system 108, on behalf of the end-user of the application. To gain access to certain resources of the interaction server system 108, these external or third-party applications leverage an open standards authorization protocol, such as Open Authorization (OAuth 2.0). Once an end-user has authorized an external or third-party application to access some data or resource owned by or associated with the end-user, an authorization server will provide the external application with an access token. After receiving the access token, requests by the external or third-party application will include the access token, providing the API server 114 of the interaction server system 108 with the ability to verify that the particular application, and the specific end-user using the application, are authorized to access the requested data or resource.

System

Figure 2:
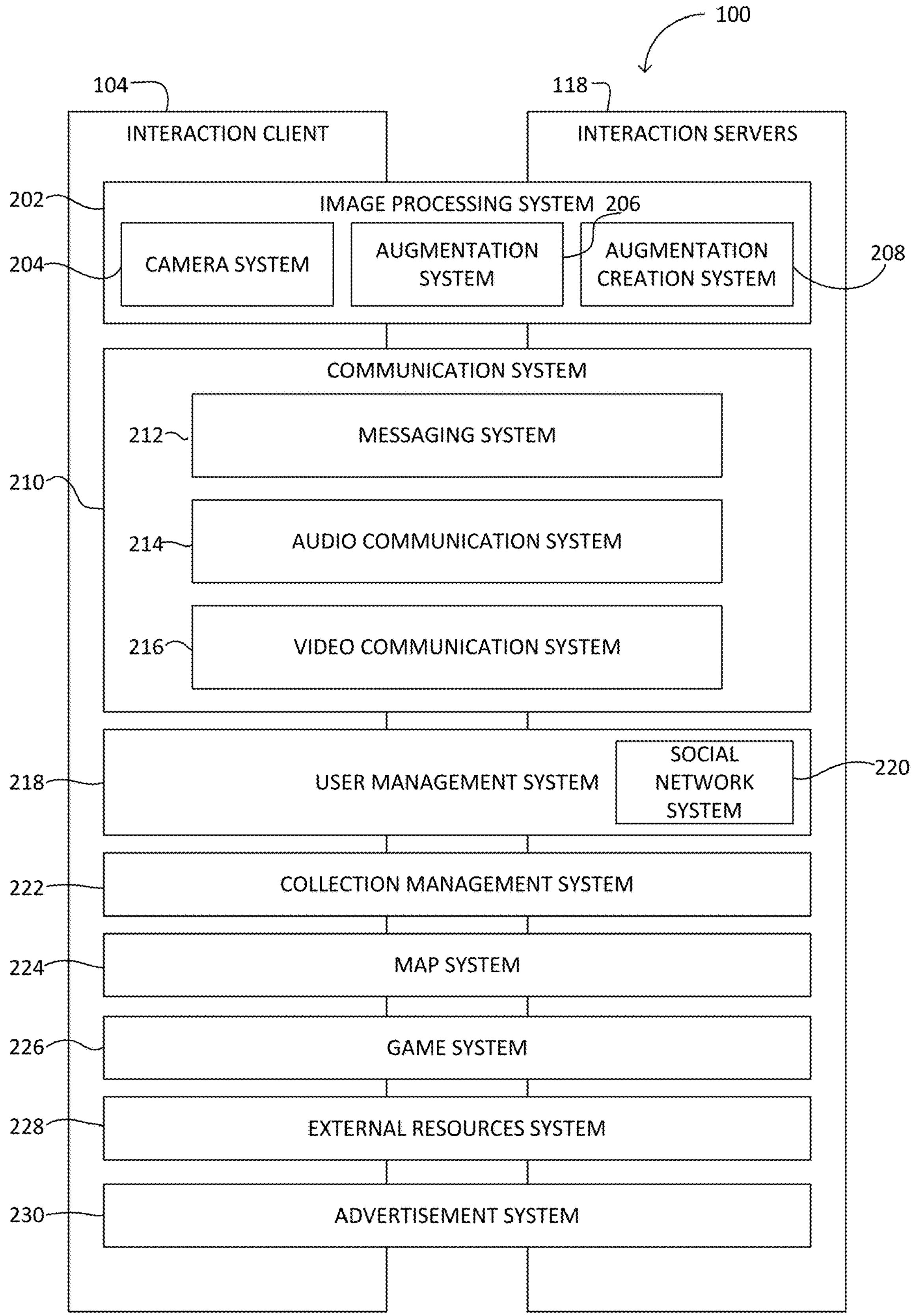
FIG. 2 is a diagrammatic representation of an interaction system that has both client-side and server-side functionality, and with which a software-based age gating service, consistent with some embodiments of the present invention, may be deployed.

FIG. 2 is a block diagram illustrating further details regarding the interaction system 100, consistent with some embodiments of the invention. Specifically, the interaction system 100 is shown to comprise the interaction client 104 and the interaction servers 118. The interaction system 100 embodies multiple subsystems, which are supported on the client-side by the interaction client 104 and on the server-side by the interaction servers 118. Example subsystems are discussed below.

An image processing system 202 provides various functions that enable a user to capture and augment (e.g., annotate or otherwise modify or edit) media content associated with a message. A camera system 204 includes control software (e.g., in a camera application) that interacts and controls an image sensor or camera device (e.g., directly or via operating system controls) of the client system 102 to modify and augment real-time images captured by the image sensor and displayed via the interaction client 104. The augmentation system 206 provides functions related to the generation and publishing of augmentations (e.g., media overlays) for images captured in real-time by cameras of the client system 102 or retrieved from memory of the client system 102. For example, the augmentation system 206 operatively selects, presents, and displays media overlays (e.g., an image filter or an image lens) to the interaction client 104 for the augmentation of real-time images received via the camera system 204 or stored images retrieved from memory of a client system 102. These augmentations are selected by the augmentation system 206 and presented to a user of an interaction client 104, based on a number of inputs and data, such as, for example:

- Geolocation of the client system 102; and
- Social network information of the end-user of the client system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at client system 102 for communication in a message, or applied to video content, such as a video content stream or feed transmitted from an interaction client 104. As such, the image processing system 202 may interact with, and support, the various subsystems of the communication system 210, such as the messaging system 212 and the video communication system 216.

A media overlay may include text or image data that can be overlaid on top of a photograph taken by the client system 102. or a video stream produced by the client system 102. In some examples, the media overlay may be a location overlay (e.g., Venice beach), a name of a live event, or a name of a merchant overlay (e.g., Beach Coffee House). In further examples, the image processing system 202 uses the geolocation of the client system 102 to identify a media overlay that includes the name of a merchant at the geolocation of the client system 102. The media overlay may include other indicia associated with the merchant. The media overlays may be stored in the databases 120 and accessed through the database server 116.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 208 supports augmented reality developer platforms and includes an application for content creators (e.g., artists and developers) to create and publish augmentations (e.g., augmented reality experiences) of the interaction client 104. The augmentation creation system 208 provides a library of built-in features and tools including, for example custom shaders, tracking technology, templates, to content creators.

In some examples, the augmentation creation system 208 provides a merchant-based publication platform that enables merchants to select a particular augmentation associated with a geolocation via a bidding process. For example, the augmentation creation system 208 associates a media overlay of the highest bidding merchant with a corresponding geolocation for a predefined amount of time.

A communication system 210 is responsible for enabling and processing multiple forms of communication and interaction within the interaction system 100 and includes a messaging system 212, an audio communication system 214, and a video communication system 216. The messaging system 212 is responsible for enforcing the temporary or time-limited access to content by the interaction clients 104. The messaging system 212 incorporates multiple timers (e.g., within an ephemeral timer system 232) that, based on duration and display parameters associated with a message, or collection of messages (e.g., a story), selectively enable access (e.g., for presentation and display) to messages and associated content via the interaction client 104. Further details regarding the operation of the ephemeral timer system 232 are provided below. The audio communication system 214 enables and supports audio communications (e.g., real-time audio chat) between multiple interaction clients 104. Similarly, the video communication system 216 enables and supports video communications (e.g., real-time video chat) between multiple interaction clients 104.

A user management system 218 is operationally responsible for the management of user data and profiles, and includes a social network system 220 that maintains information regarding relationships between users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to a user to include user-generated content into a collection. In such cases, the collection management system 222 operates to automatically make payments to such users to use their content.

A map system 224 provides various geographic location functions, and supports the presentation of map-based media content and messages by the interaction client 104. For example, the map system 224 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 226 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 228 provides an interface for the interaction client 104 to communicate with remote servers (e.g., third-party servers 110) to launch or access external resources, including in some instances, third-party applications or applets. Each third-party server 110 hosts, for example, a markup language (e.g., HTML5) based application or a small-scale version of an application (e.g., game, utility, payment, ride-sharing, content streaming, and other applications). The interaction client 104 may launch a web-based resource (e.g., third-party application) by accessing the HTML5 file from the third-party servers 110 associated with the web-based resource. Applications hosted by third-party servers 110 are programmed in JavaScript leveraging a Software Development Kit (SDK) provided by or associated with the interaction servers 118. The SDK includes the specification of an API with commands or functions that can be called or invoked by third-party web-based applications. The interaction servers 118 host a JavaScript library that provides a given external resource access to specific user data of the interaction client 104, when authorization to access such data has been granted. HTML5 is an example of a technology for programming games and third-party applications, but applications and resources programmed based on other technologies can be used.

To integrate the functions of the SDK into the third-party web-based resource, the SDK is downloaded by a third-party server 110 from the interaction servers 118 or is otherwise received by the third-party servers 110. Once downloaded or received, the SDK is included as part of the application code of a third-party application or web-based external resource. The code of the web-based resource can then call or invoke certain functions of the SDK to integrate features of the interaction client 104 into a third-party application. Accordingly, when using various API calls specified in the SDK, a third-party application can invoke functionality to access data and resources of the interaction server system 108, and also invoke functionality to access data and resources of one or more externally hosted, remote servers.

The SDK stored on the interaction server system 108 effectively provides the bridge between an external resource (e.g., third-party applications 106 or applets and the interaction client 104). This gives the end-user a seamless experience of communicating with other users on the interaction client 104 while also preserving the look and feel of the interaction client 104. To bridge communications between an external resource (e.g., a third party application or resource) and an interaction client 104, the SDK facilitates communication between third-party servers 110 and the interaction client 104. A WebViewJavaScriptBridge running on a client system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party applications and servers 110. The SDK limits which information is shared based on the needs of the external resource. Each third-party server 110 provides an HTML5 file corresponding to the web-based external resource to interaction servers 118. The interaction servers 118 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access end-user data of the interaction client 104. In response to determining that the launched external resource has been previously authorized to access end-user data of the interaction client 104, the interaction client 104 presents another graphical user interface of the external resource that includes functions and features of the external resource. In response to determining that the launched external resource has not been previously authorized to access end-user data of the interaction client 104, after a threshold period of time (e.g., 3 seconds) of displaying the landing page or title screen of the external resource, the interaction client 104 slides up (e.g., animates a menu as surfacing from a bottom of the screen to a middle of or other portion of the screen) a menu for authorizing the external resource to access the end-user data. The menu identifies the type of end-user data that the external resource will be authorized to access and/or use. In response to receiving an end-user selection of an option granting the third-party application access to the end-user user information, the interaction client 104 adds the external resource to a list of authorized external resources and allows the external resource to access the end-user data from the interaction client 104. The external resource is authorized by the interaction client 104 to access the user data under an OAuth 2.0 framework.

The interaction client 104 controls the type of end-user data that is shared with external resources based on the type of external resource being authorized. For example, external resources that include full-scale applications (e.g., an application 106) are provided with access to a first type of end-user data (e.g., two-dimensional avatars of users with or without different avatar characteristics). As another example, external resources that include small-scale versions of applications (e.g., web-based versions of applications) are provided with access to a second type of end-user data (e.g., payment information, two-dimensional avatars of end-users, three-dimensional avatars of end-users, and avatars with various avatar characteristics). Avatar characteristics include different ways to customize a look and feel of an avatar, such as different poses, facial features, clothing, and so forth. Consistent with various embodiments, the age gating service may be accessible to full-scale applications, small-scale applications, or both.

An advertisement system 230 operationally enables the purchasing of advertisements by third parties for presentation to end-users via the interaction clients 104 and also handles the delivery and presentation of these advertisements.

Age Gating Service Architecture

Figure 3:
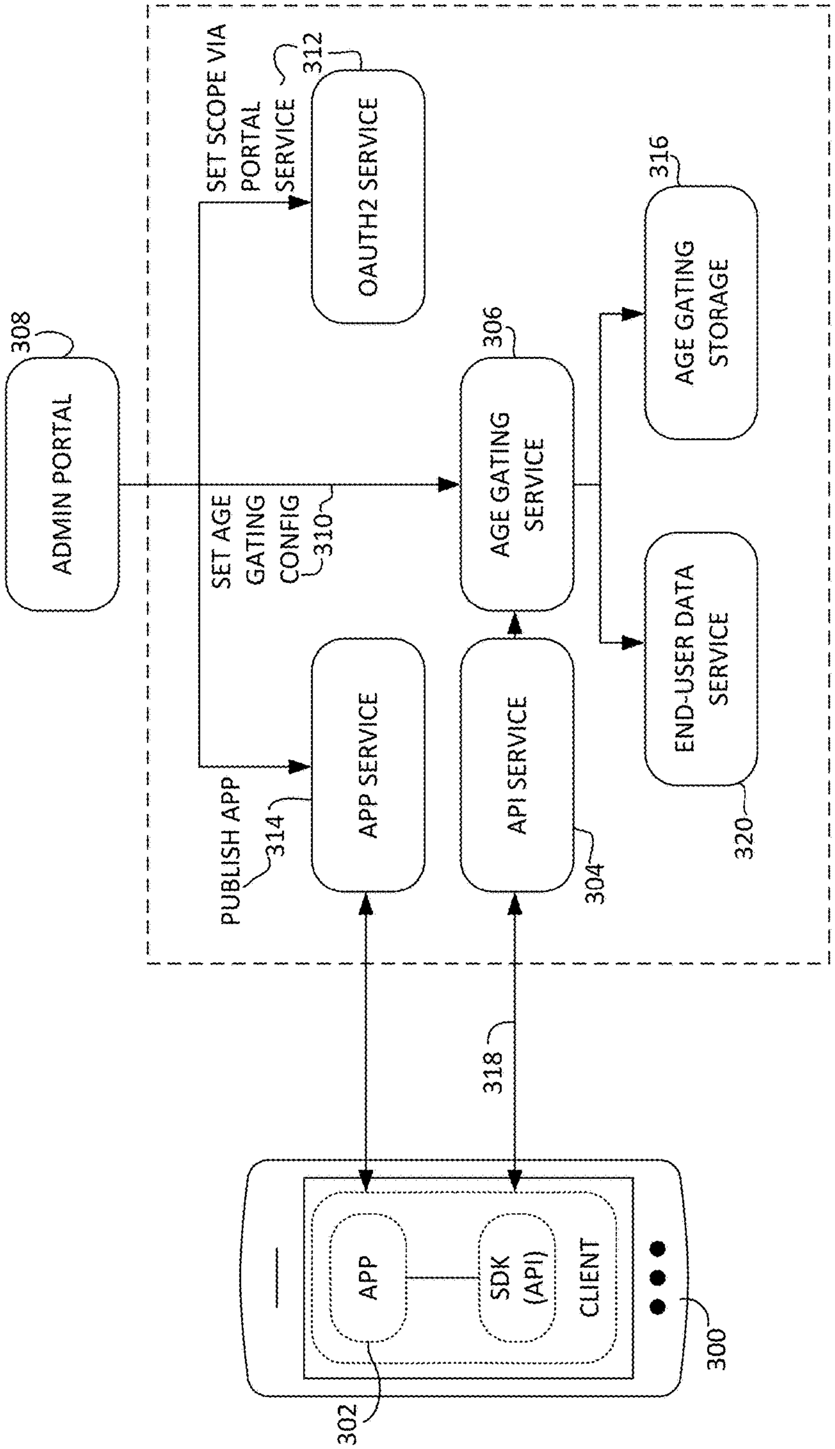
FIG. 3 is a diagrammatic representation of a mobile computing device executing a third-party application implemented to utilize an application programming interface (API) for accessing an age gating service of an interaction server system, consistent with some embodiments of the present invention.

FIG. 3 is a diagrammatic representation of a mobile computing device 300 executing a third-party application 302 implemented to utilize an API service 304 for accessing an age gating service 306 of an interaction server system, consistent with some embodiments of the present invention. Before a third-party application 302 can access the age gating service 306, the age gating logic for the third-party application has to be established and stored. The specific techniques for establishing the age gating logic may vary from one embodiment to the next. For instance, as shown in FIG. 3, consistent with some embodiments, an administrator (or, admin) of the online service is responsible for configuring the age gating logic 310 of each application through an admin portal 308. In other instances, a third-party developer may utilize a developer portal to directly establish the age gating logic for a third-party application, and then the admin will review and approve the age gating logic, prior to the third-party application being published and becoming accessible to end-users. In either case, for a specific third-party application, the age gating logic may define or establish a global age threshold, or alternatively, a plurality of regional age gating thresholds, with each regional age gating threshold of the plurality being specified for use in a specific geographic location or region. As shown in FIG. 3, once the age gating logic is established for a third-party application, the age gating logic is stored in an age gating storage 316 for subsequent recall. With some embodiments, the age gating logic will be stored in association with an identifier of the application with which the age gating logic is associated. Accordingly, when needed, the age gating logic can be retrieved from the age gating storage 316 quickly by referencing the application identifier for the application with which the age gating logic is associated.

Figure 4:
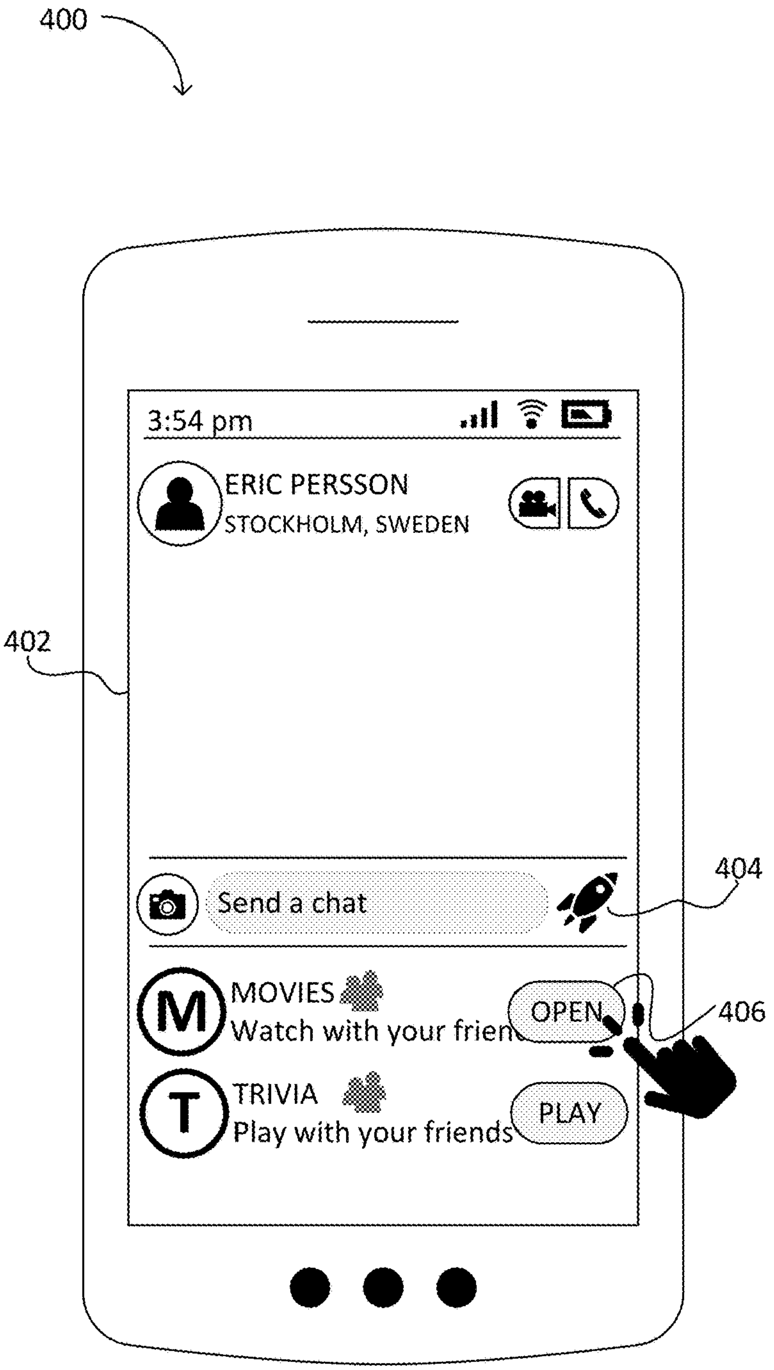
FIG. 4 is a diagram illustrating an example of a user interface of a client application from which a third-party application may be invoked, consistent with some embodiments of the present invention.

As shown in FIG. 3, in addition to setting the age gating configuration 310, an admin of the online service may also use the admin portal 308 to set a scope of the OAuth 2.0 service to include authorization to access the age gating service 306. Scopes are a mechanism in OAuth 2.0 that may limit the access an application has to the data associated with the account of the end-user, and in some instances, the services provided by the online service. Accordingly, a third-party application 302 can request one or more scopes, and information regarding the requested data associated with each scope will then be presented via the user interface of the application to the end-user with a prompt asking for the consent of the end-user. By simply pressing a button of the user interface presented by the application 302, the end-user can grant the third-party application 302 with access to certain data and/or resources of the interaction server. Accordingly, as shown in FIG. 3 with reference 312, the admin will specify a scope for the OAuth 2.0 service that will include authorizing access to the age gating service. As such, the end-user will be prompted, via a user interface of the third-party application 302, to grant the third-party application 302 consent to access the age gating service 306 on behalf of the end-user. An example of a user interface showing such a prompt is illustrated in FIG. 4.

As shown in FIG. 3, subsequent to a third-party application developer submitting an application for publication, an admin will leverage an admin portal 308 to undertake a review of the application and the age gating logic, to among other things, ensure that the application and age gating logic are consistent with the application development rules and guidelines as provided by an operator of the online service. Once the admin has established the scope for the OAuth 2.0 service and reviewed and approved the age gating logic for the third-party application, the admin will use the admin portal 308 to publish the third-party application to an application service 314, which will also cause the age gating logic for the application to be stored in the age gating storage 316 accessible to the age gating service 306.

Although not shown in FIG. 3, consistent with some embodiments, a third-party application developer may leverage a developer portal in developing an application to be deployed for use by end-users of the online service. Via the developer portal, a third-party application developer may develop an application and specify for the application the age gating logic to be used by the application. Accordingly, at least with some embodiments, a third-party developer may invoke an API function or method via the developer portal that will communicate the age gating logic to the online service, where an admin of the online service will review and approve (or, reject) the age gating logic that has been specified by the third-party application developer.

When an end-user invokes the third-party application, the application will make a request, on behalf of the end-user, to the app service 314 for various information about the end-user. Before the application can access the end-user information, the application will prompt the end-user to authorize the third-party application to access his or her information. If the application has been configured to use the age gating service, and this is the first time the end-user is invoking the application, the end-user may be prompted to grant authorization to the application to access the age gating service, on behalf of the end-user.

Turning now to FIG. 4, a mobile computing device 400 presenting an example of a user interface 402 associated with an interaction server system is presented. In this example, the user interface shows a chat or messaging interface, which enables the end-user to create messages, send message to other end-users, and receive messages from others, using the interaction server system. When an end-user selects the graphical icon 404, the end-user is presented with available applications that can be invoked directly from the chat interface. For example, in many instances, the applications may involve a social feature that allows the end-user to interact, through an application, with other end-users of the interaction server system. Accordingly, the graphical user interface element or button with reference 406, when selected, will invoke an application with the name, “MOVIES.” In this example, the “MOVIES” application may be a third-party application that provides the end-user with access to a video-based content streaming service. The third-party application may be integrated with the interaction server system, allowing the end-user to share content, or links to content, with other end-users of the interaction server system, via a user interface of the application. Consequently, when the application is first invoked, the end-user may be presented with a message indicating the nature of any personal end-user information that the third-party application may access. If, this is the first time the end-user is invoking the application, the third-party application may display a specific message referred to herein as a first-time end-user experience message.

Figure 5:
FIG. 5 is a diagram illustrating an example of a user interface of a third-party application, displaying a first-time end-user experience message, consistent with some embodiments of the present invention.

Turning now to FIG. 5, an example of a user interface showing a first-time end-user experience message 500 is shown. In this example, because the third-party application is configured to utilize the age gating service of the interaction server system, the first-time end-user experience message 500 conveys to the end-user that the application may access the age gating service on behalf of the end-user. Accordingly, the end-user is prompted to select the button, labeled “CONTINUE” 502, in order to grant the application with the necessary authorization to access the age gating service on behalf of the end-user.

Referring again to FIG. 3, as shown with reference number 318, when the end-user selects the button 502, an API method is invoked causing an API request for end-user age validation to be communicated from the application to the API service 304. The request 318 includes an access token previously provided to the application by the OAuth 2.0 service 312. The access token is stored in association with the identifier of the end-user and the identifier of the application, such that, given the access token, the API service can determine both the application and the end-user associated with the access token and the API request.

When the API service 304 receives the API request to validate the age of the end-user, the API service will first determine whether the application is authorized to invoke a request, on behalf of the end-user, to access the age gating service 306. This may be done by simply performing a look-up operation to ensure that the access identifier is included in an authorization list, or otherwise stored in a way to indicate that the end-user and application have been authorized to access the age gating service 306. Next, after determining that the application is authorized to access the age gating service, the age gating service will then use the application identifier, as obtained using the access token received with the request, to fetch or obtain the age gating logic from the age gating storage 316, where the age gating logic is stored in association with the application identifier of the requesting application. Similarly, using the identifier of the end-user, as obtained using the access token received with the API request 318, the age gating service 306 will obtain from the end-user data service 320 the stated age of the end-user. Finally, the age gating service 306 will apply the age gating logic to the stated age of the end-user to determine a Boolean value to be returned 318 to the application, where the Boolean value reflects whether the stated age of the end-user is above or below an age threshold specified via the age gating logic for the application. In a situation where the age gating logic specifies more than one regional age threshold, the age gating service may first determine a location associated with the end-user, and then select a regional age threshold specified by the age gating logic that is consistent (e.g., matches or otherwise corresponds) with the location of the end-user. In any case, once the Boolean value has been returned to the application 302, the application logic can customize the end-user experience based on whether or not the age of the end-user satisfies the relevant criteria as specified by the age gating logic and reflected in the Boolean value received in response to the API request for age validation.

Consistent with some embodiments, the Boolean value returned to the application 302 may be cached, so that the application logic can access the Boolean value from more than one entry point. For example, for an application providing access to age-gated streaming content, the Boolean value that is used to determine whether an end-user is allowed access to age-restricted content may be accessed at different times, as the end-user browses various content items, and/or otherwise navigates the user interface(s) of the third-party application.

Machine Architecture

Figure 6:
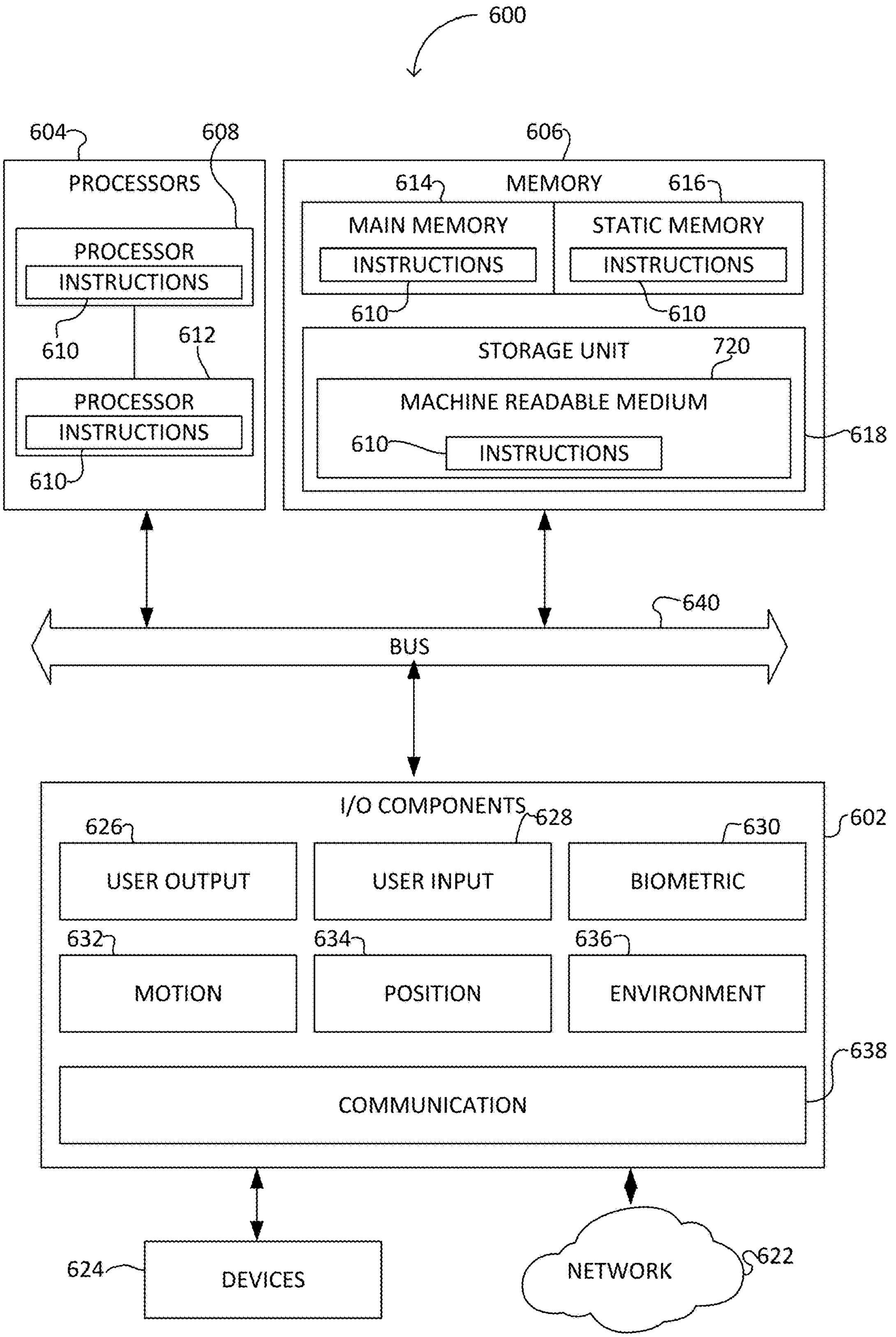
FIG. 6 is a diagrammatic representation of a machine in the form of a computer system within which a set of instructions may be executed for causing the machine to perform any one or more of the methodologies discussed herein, according to some examples.

FIG. 6 is a diagrammatic representation of a machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while a single machine 600 is illustrated, the term "machine" shall also be taken to include a collection of machines that individually or jointly execute the instructions 610 to perform any one or more of the methodologies discussed herein. The machine 600, for example, may comprise the client system 102 or any one of multiple server devices forming part of the interaction server system 108. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client system 102 may have a camera system comprising, for example, front cameras on a front surface of the client system 102 and rear cameras on a rear surface of the client system 102. The front cameras may, for example, be used to capture still images and video of a user of the client system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client system 102 may also include a 360° camera for capturing 360° photographs and videos.

Further, the camera system of the client system 102 may include dual rear cameras (e.g., a primary camera as well as a depth-sensing camera), or even triple, quad or penta rear camera configurations on the front and rear sides of the client system 102. These multiple camera systems may include a wide camera, an ultra-wide camera, a telephoto camera, a macro camera, and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
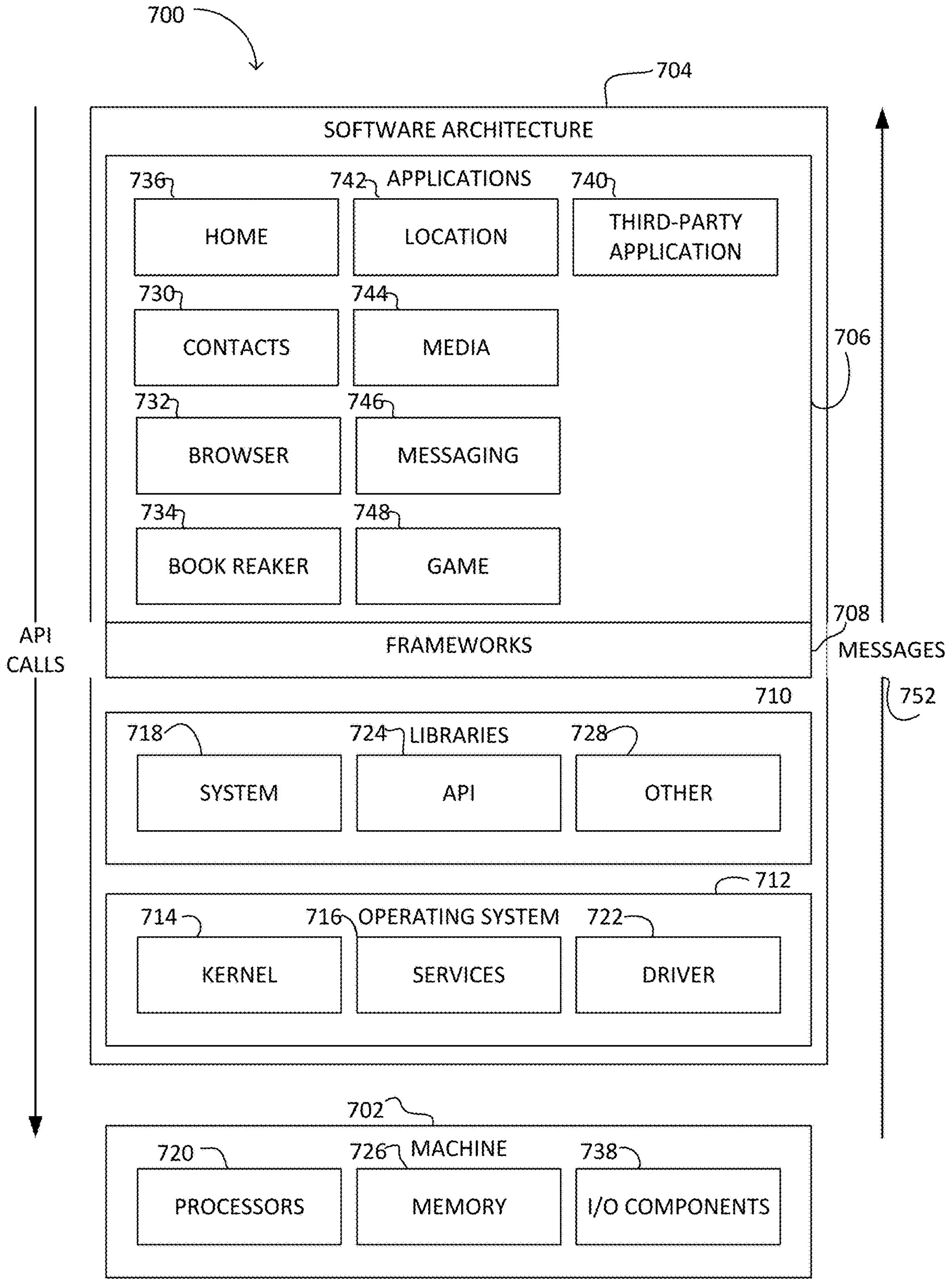
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionalities described herein.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" (or, "client computing device") refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method comprising:

at an online service, receiving an application programming interface (API) request for end-user age validation from a third-party application executing on a client computing device, the API request including an access token associated with an identifier for the third-party application and an identifier for an end-user of the online service, wherein age gating logic for the third-party application was previously established through a separate API request that included the identifier for the third-party application, the age gating logic stored in a database in association with the identifier for the third-party application for subsequent retrieval during validation requests;

at the online service, processing the received API request by i) confirming that the third-party application is authorized to access an age gating service via the API request, ii) obtaining the previously established age gating logic for the third-party application by retrieving the age gating logic stored in association with the identifier for the third-party application, iii) obtaining information indicating a birthdate of the end-user, and iv) performing a validation operation to validate the birthdate of the end-user using the age gating logic for the third-party application; and communicating to the third-party application executing on the client computing device a Boolean value indicating whether the end-user is above or below an age threshold specified in the age gating logic;

wherein the separate API request through which the age gating logic was previously established was received by the online service prior to receipt by the online service of any API request for end-user age validation for the third-party application, and wherein the age gating logic stored in association with the identifier for the third-party application defines an application-level policy for the third-party application that, once stored, is retrieved by the online service and applied uniformly across a plurality of subsequent API requests for end-user age validation received from the third-party application for a respective plurality of different end-users of the third-party application.

2. The computer-implemented method of claim 1, wherein the access token associated with the identifier for the third-party application and the identifier for the end-user of the online service is an OAuth 2.0 access token, stored in a database accessible to the online service and in association with the identifier of the end-user and the identifier of the third-party application.

3. The computer-implemented method of claim 1, wherein the age gating logic specifies a global age threshold for the third-party application executing on the client computing device.

4. The computer-implemented method of claim 1, wherein the age gating logic specifies a plurality of age thresholds for the third-party application executing on the client computing device, each age threshold of the plurality of age thresholds associated with and relevant with respect to a particular geographical location, wherein performing the validation operation to validate the birthdate of the end-user comprises applying an age threshold specified for a geographical location matching a geographical location associated with the end-user.

5. The computer-implemented method of claim 1, wherein confirming that the third-party application is authorized to access an age gating service via the API request comprises:

confirming that the identifier for the third-party application associated with the access token received with the API request is in a list of identifiers for third-party applications that have been approved to access the age gating service.

6. The computer-implemented method of claim 1, wherein obtaining age gating logic for the third-party application comprises:

obtaining age gating logic for the third-party application that is stored in association with the identifier for the third-party application associated with the access token received with the API request.

7. The computer-implemented method of claim 1, wherein obtaining information indicating a birthdate of the end-user comprises:

obtaining the birthdate of the end-user by issuing a request to an end-user data service, using the identifier of the end-user associated with the access token received with the API request.

8. The computer-implemented method of claim 1, further comprising:

prior to receiving the API request for end-user age validation from the third-party application:

receiving the separate API request for configuring age gating logic for the third-party application, the separate API request specifying the age gating logic for the third-party application and including the identifier for the third-party application;

receiving an indication of approval of the age gating logic for the third-party application via an admin portal of the online service;

storing the age gating logic in the database in association with the identifier for the third-party application for subsequent retrieval during validation requests; and publishing the third-party application.

9. A non-transitory computer-readable storage medium, the computer-readable storage medium including instructions that when executed by a computer, cause the computer to perform operations comprising:

receive an application programming interface (API) request for end-user age validation from a third-party application executing on a client computing device, the API request including an access token associated with an identifier for the third-party application and an identifier for an end-user of an online service, wherein age gating logic for the third-party application was previously established through a separate API request that included the identifier for the third-party application, the age gating logic stored in a database in association with the identifier for the third-party application for subsequent retrieval during validation requests;

process the received API request by i) confirming that the third-party application is authorized to access an age gating service via the API request, ii) obtaining the previously established age gating logic for the third-party application by retrieving the age gating logic stored in association with the identifier for the third-party application, iii) obtaining information indicating a birthdate of the end-user, and iv) performing a validation operation to validate the birthdate of the end-user using the age gating logic for the third-party application; and communicate to the third-party application executing on the client computing device a Boolean value indicating whether the end-user is above or below an age threshold specified in the age gating logic;

wherein the separate API request through which the age gating logic was previously established was received by the online service prior to receipt by the online service of any API request for end-user age validation for the third-party application, and wherein the age gating logic stored in association with the identifier for the third-party application defines an application-level policy for the third-party application that, once stored, is retrieved by the online service and applied uniformly across a plurality of subsequent API requests for end-user age validation received from the third-party application for a respective plurality of different end-users of the third-party application.

10. The non-transitory computer-readable storage medium of claim 9, wherein the access token associated with the identifier for the third-party application and the identifier for the end-user of the online service is an OAuth 2.0 access token stored in a database accessible to the online service and in association with the identifier of the end-user and the identifier of the third-party application.

11. The non-transitory computer-readable storage medium of claim 9, wherein the age gating logic specifies a global age threshold for the third-party application executing on the client computing device.

12. The non-transitory computer-readable storage medium of claim 9, wherein the age gating logic specifies a plurality of regional age thresholds for the third-party application executing on the client computing device, each regional age threshold of the plurality of regional age thresholds associated with and relevant with respect to a particular geographical region, wherein performing the validation operation to validate the birthdate of the end-user comprises applying a regional age threshold specified for a geographical region matching a geographical region associated with the end-user.

13. The non-transitory computer-readable storage medium of claim 9, wherein confirming that the third-party application is authorized to access an age gating service via the API request comprises:

confirming that the identifier for the third-party application associated with the access token received with the API request is in a list of identifiers for third-party applications that have been approved to access the age gating service.

14. The non-transitory computer-readable storage medium of claim 9, wherein obtaining age gating logic for the third-party application comprises:

obtaining age gating logic for the third-party application that is stored in association with the identifier for the third-party application associated with the access token received with the API request.

15. The non-transitory computer-readable storage medium of claim 9, wherein obtaining information indicating a birthdate of the end-user comprises:

obtaining the birthdate of the end-user by issuing a request to an end-user data service, using the identifier of the end-user associated with the access token received with the API request.

16. The non-transitory computer-readable storage medium of claim 9, the computer-readable storage medium including additional instructions that when executed by a computer, cause the computer to perform operations comprising:

prior to receiving the API request for end-user age validation from the third-party application:

receive the separate API request for configuring age gating logic for the third-party application, the separate API request specifying the age gating logic for the third-party application and including the identifier for the third-party application;

receive an indication of approval of the age gating logic for the third-party application via an admin portal of the online service;

store the age gating logic in the database in association with the identifier for the third-party application for subsequent retrieval during validation requests; and publish the third-party application.

17. A computing apparatus comprising:

a processor; and a memory storing instructions that, when executed by the processor, configure the apparatus to perform operations comprising:

receive an application programming interface (API) request for end-user age validation from a third-party application executing on a client computing device, the API request including an access token associated with an identifier for the third-party application and an identifier for an end-user of an online service, wherein age gating logic for the third-party application was previously established through a separate API request that included the identifier for the third-party application, the age gating logic stored in a database in association with the identifier for the third-party application for subsequent retrieval during validation requests;

process the received API request by i) confirming that the third-party application is authorized to access an age gating service via the API request, ii) obtaining the previously established age gating logic for the third-party application by retrieving the age gating logic stored in association with the identifier for the third-party application, iii) obtaining information indicating a birthdate of the end-user, and iv) performing a validation operation to validate the birthdate of the end-user using the age gating logic for the third-party application; and communicate to the third-party application executing on the client computing device a Boolean value indicating whether the end-user is above or below an age threshold specified in the age gating logic;

wherein the separate API request through which the age gating logic was previously established was received by the online service prior to receipt by the online service of any API request for end-user age validation for the third-party application, and wherein the age gating logic stored in association with the identifier for the third-party application defines an application-level policy for the third-party application that, once stored, is retrieved by the online service and applied uniformly across a plurality of subsequent API requests for end-user age validation received from the third-party application for a respective plurality of different end-users of the third-party application.

18. The computing apparatus of claim 17, wherein the access token associated with the identifier for the third-party application and the identifier for the end-user of the online service is an OAuth 2.0 access token stored in a database accessible to the online service and in association with the identifier of the end-user and the identifier of the third-party application.

19. The computing apparatus of claim 17, wherein the age gating logic specifies a global age threshold for the third-party application executing on the client computing device.

20. The computing apparatus of claim 17, wherein the age gating logic specifies a plurality of regional age thresholds for the third-party application executing on the client computing device, each regional age threshold of the plurality of regional age thresholds associated with and relevant with respect to a particular geographical region, wherein performing the validation operation to validate the birthdate of the end-user comprises applying a regional age threshold specified for a geographical region matching a geographical region associated with the end-user.

* * * * *